United States Patent
Yang et al.

(10) Patent No.: US 12,047,181 B2
(45) Date of Patent: Jul. 23, 2024

(54) RETRANSMISSION OF CANCELLED HARQ FEEDBACK

(71) Applicant: Apple Inc., Cupertino, CA (US)

(72) Inventors: Weidong Yang, San Diego, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Sigen Ye, Whitehouse Station, NJ (US); Wei Zeng, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 17/593,328

(22) PCT Filed: Jan. 14, 2021

(86) PCT No.: PCT/CN2021/071918
§ 371 (c)(1),
(2) Date: Sep. 15, 2021

(87) PCT Pub. No.: WO2022/151263
PCT Pub. Date: Jul. 21, 2022

(65) Prior Publication Data
US 2023/0171038 A1    Jun. 1, 2023

(51) Int. Cl.
*H04L 1/1812*    (2023.01)
*H04L 1/1829*    (2023.01)
*H04L 5/00*    (2006.01)

(52) U.S. Cl.
CPC .......... *H04L 1/1816* (2013.01); *H04L 1/1854* (2013.01); *H04L 5/001* (2013.01)

(58) Field of Classification Search
CPC ..... H04L 1/1816; H04L 1/1854; H04L 5/001; H04L 1/1822; H04L 1/1861; H04L 1/1864; H04L 5/0055
See application file for complete search history.

(56) References Cited

U.S. PATENT DOCUMENTS

| 10,750,488 B2 | 8/2020 | He et al. |
| 2019/0021078 A1 | 1/2019 | Otwani et al. |

(Continued)

FOREIGN PATENT DOCUMENTS

| CN | 111800871 | 10/2020 |

OTHER PUBLICATIONS

Nokia, "Feature lead summary #2 on HARQ-ACK feedback enhancements for NR Rel-17 URLL/IIoT (AI 8.3.1)", 3GPP TSG RAN WG1 Meeting #102-e, R1-2007107, Aug. 28, 2020, 74 sheets.

(Continued)

*Primary Examiner* — Charles C Jiang
*Assistant Examiner* — Shawn D Miller
(74) *Attorney, Agent, or Firm* — Fay Kaplun & Marcin, LLP

(57) ABSTRACT

A user equipment (UE) is configured to transmit cancelled hybrid automatic repeat request (HARQ) feedback. The UE generating HARQ feedback for one or more HARQ process corresponding to a component carrier (CC), identifies that a scheduled transmission for the HARQ feedback has been cancelled and retransmits the cancelled HARQ feedback using a type 3 HARQ codebook.

18 Claims, 9 Drawing Sheets

(56) References Cited

U.S. PATENT DOCUMENTS

2020/0366415 A1* 11/2020 Khoshnevisan ...... H04L 1/1671
2022/0103304 A1* 3/2022 Elshafie ................ H04L 1/1819

OTHER PUBLICATIONS

Sharp, "Remaining issues and corrections on HARQ enhancement for NR-U", 3GPP TSG RAN WG1 #101, R1-2004325, Jun. 5, 2020, 6 sheets.

* cited by examiner

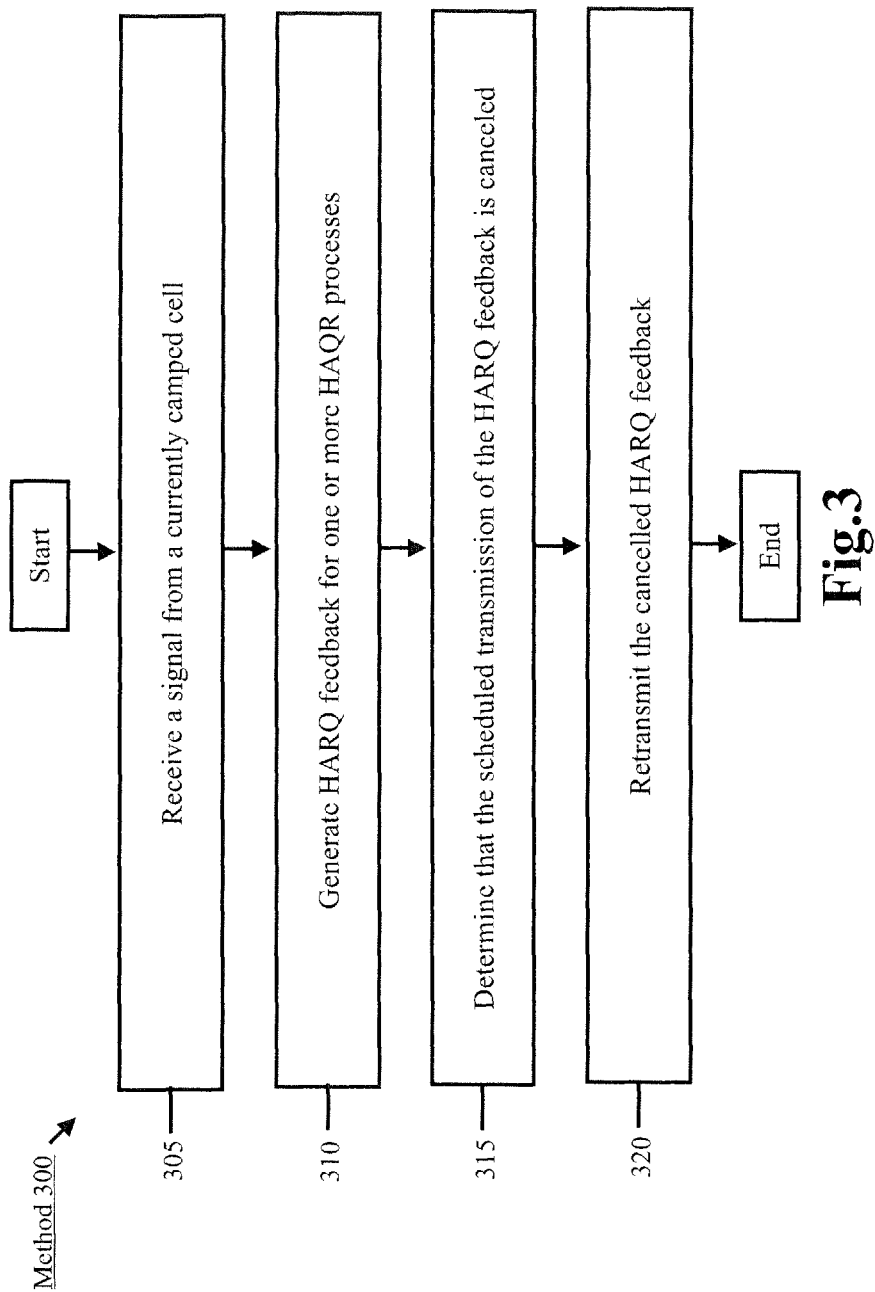

```
PhysicalCellGroupConfig ::= SEQUENCE {
...
HARQProcessIDGroup0{
    pdsch-HARQ-ACK-OneShotFeedback-r16 ENUMERATED {true} OPTIONAL,
    pdsch-HARQ-ACK-OneShotFeedbackNDI-r16 ENUMERATED {true} OPTIONAL,
    pdsch-HARQ-ACK-OneShotFeedbackCBG-r16 ENUMERATED {true} OPTIONAL
    HARQ-ID-range
},
HARQProcessIDGroup1{
    pdsch-HARQ-ACK-OneShotFeedback-r16 ENUMERATED {true} OPTIONAL,
    pdsch-HARQ-ACK-OneShotFeedbackNDI-r16 ENUMERATED {true} OPTIONAL,
    pdsch-HARQ-ACK-OneShotFeedbackCBG-r16 ENUMERATED {true} OPTIONAL
    HARQ-ID-range
},
...
}
```

Fig. 4

| One-Shot HARQ-ACK Request 502 | Priority indicator 504 | UE Behavior 506 | Row |
|---|---|---|---|
| 0 | 0 | One shot HARQ-ACK is not triggered | 512 |
| 0 | 1 | One shot HARQ-ACK is not triggered | 514 |
| 1 | 0 | One shot HARQ-ACK for HARQ process ID group 0 is triggered the PUCCH transmission is treated as "high physical layer priority" | 516 |
| 1 | 1 | One shot HARQ-ACK for HARQ process ID group 0 is triggered the PUCCH transmission is treated as "high physical layer priority" | 518 |

Table 500

Fig. 5

```
PhysicalCellGroupConfig ::= SEQUENCE {
    ...
    OneShotFeedback-for-LowPriority{
        pdsch-HARQ-ACK-OneShotFeedback-r16 ENUMERATED {true} OPTIONAL,
        pdsch-HARQ-ACK-OneShotFeedbackNDI-r16 ENUMERATED {true} OPTIONAL,
        pdsch-HARQ-ACK-OneShotFeedbackCBG-r16 ENUMERATED {true} OPTIONAL
        HARQ-ID-range
        associated-CC-List
    },
    OneShotFeedback-for-HighPriority{
        pdsch-HARQ-ACK-OneShotFeedback-r16 ENUMERATED {true} OPTIONAL,
        pdsch-HARQ-ACK-OneShotFeedbackNDI-r16 ENUMERATED {true} OPTIONAL,
        pdsch-HARQ-ACK-OneShotFeedbackCBG-r16 ENUMERATED {true} OPTIONAL
        HARQ-ID-range
        associated-CC-List
    },
    ...
}
```

Fig. 7

| One-Shot HARQ-ACK Request 802 | Priority indicator 804 | UE Behavior 806 | Row |
|---|---|---|---|
| 0 | 0 | One shot HARQ-ACK is not triggered | 812 |
| 0 | 1 | One shot HARQ-ACK is not triggered | 814 |
| 1 | 0 | One shot HARQ-ACK for low physical layer priority feedback is triggered and the PUCCH transmission is treated as "low physical layer priority" | 816 |
| 1 | 1 | One shot HARQ-ACK for high physical layer priority feedback is triggered and the PUCCH transmission is treated as "high physical layer priority" | 818 |

Table 800

Fig. 8

| One-Shot HARQ-ACK Request 902 | Priority indicator 904 | UE Behavior 906 | Row |
|---|---|---|---|
| 0 | 0 | One shot HARQ-ACK is not triggered | 912 |
| 0 | 1 | One shot HARQ-ACK is not triggered | 914 |
| 1 | 0 | One shot HARQ-ACK feedback for a first set of selected HARQ process IDs is triggered and the PUCCH transmission is treated as "low physical layer priority" | 916 |
| 1 | 1 | One shot HARQ-ACK feedback for a second set of HARQ process IDs is triggered and the PUCCH transmission is treated as "high physical layer priority" | 918 |

Table 900

Fig. 9

RETRANSMISSION OF CANCELLED HARQ FEEDBACK

BACKGROUND

A component carrier (CC) may be configured with multiple hybrid automatic repeat request (HARQ) processes. Generally, a HARQ process refers to a signaling exchange between a transmitting device and a receiving device. Initially, the transmitting device transmits data to the receiving device. In response, the receiving device may send feedback to the transmitting device concerning the transmitted data. The feedback may indicate to the transmitting device whether the transmission of the data is successful. If the previous transmission was not successful, the transmitting device may retransmit the data. For any of a variety of different reasons, the transmission of the feedback may be cancelled by the receiving device. At a subsequent time, the receiving device may be triggered to retransmit the previously cancelled HARQ feedback.

To provide an example, consider a scenario in which a user equipment (UE) is the receiving device and a base station is the transmitting device. Initially, the UE receives downlink data from the base station via a CC. The UE then processes the data and generates HARQ feedback bits for HARQ processes of the CC. The UE is scheduled to transmit the HARQ feedback at a particular time or opportunity. However, for any of a variety of different reasons, the scheduled transmission of the HARQ feedback is cancelled. Subsequently, the UE may be triggered to retransmit the cancelled HARQ feedback.

SUMMARY

Some exemplary embodiments are related to a processor of a user equipment (UE) configured to perform operations. The operations include generating hybrid automatic repeat request (HARQ) feedback for one or more HARQ process corresponding to a component carrier (CC), identifying that a scheduled transmission for the HARQ feedback has been cancelled and retransmitting the cancelled HARQ feedback using a type 3 HARQ codebook.

Other exemplary embodiments are related to a user equipment (UE) including a transceiver configured to communicate with a network and a processor communicatively coupled to the transceiver and configured to perform operations. The operations include generating hybrid automatic repeat request (HARQ) feedback for one or more HARQ process corresponding to a component carrier (CC), identifying that a scheduled transmission for the HARQ feedback has been cancelled and retransmitting the cancelled HARQ feedback using a type 3 HARQ codebook.

Still further exemplary embodiments are related to a processor of a base station configured to perform operations. The operations include configuring a user equipment (UE) with a component carrier (CC), wherein the CC is configured to include multiple HARQ processes, transmitting a signal to the UE, wherein the UE is configured to generate hybrid automatic repeat request (HARQ) feedback for one or more HARQ process in response to the signal and receiving the HARQ feedback, wherein the HARQ feedback is cancelled HARQ feedback and transmitted by the UE using a type 3 HARQ codebook.

BRIEF DESCRIPTION OF THE DRAWINGS

FIG. 3 shows a method for the retransmission of cancelled hybrid automatic repeat request (HARQ) feedback according to various exemplary embodiments.

FIG. 4 shows an example of the HARQ process ID group specific radio resource control (RRC) configuration according to various exemplary embodiments.

FIG. 5 shows a table that describes UE behavior in response to downlink control information (DCI) related to type 3 HARQ feedback according to various exemplary embodiments.

FIG. 7 shows an example of the physical layer priority specific RRC configuration according to various exemplary embodiments.

FIG. 8 shows a table that describes UE behavior in response to DCI related to type 3 HARQ feedback according to various exemplary embodiments.

FIG. 9 shows a table that describes UE behavior in response to DCI related to type 3 HARQ feedback according to various exemplary embodiments.

DETAILED DESCRIPTION

Figure 1:
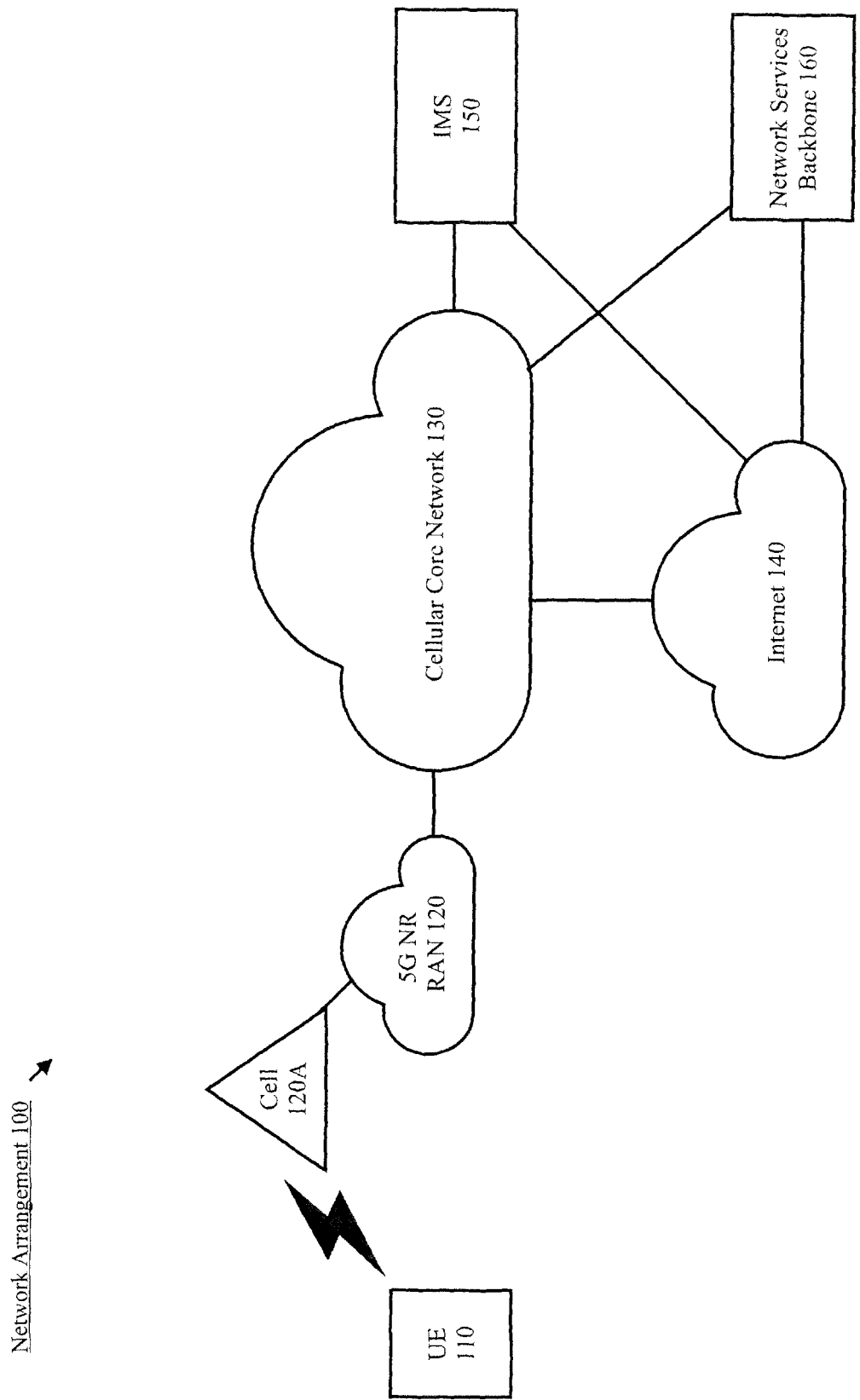
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to the retransmission of cancelled hybrid automatic repeat request (HARQ) feedback.

The exemplary embodiments are described with regard to the UE. However, reference to a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to HARQ processes. A "HARQ process" generally refers to a signaling exchange between a transmitting device and a receiving device. Initially, the transmitting device may transmit data to the receiving device that is associated with a particular HARQ process ID. In response, the receiving device sends feedback to the transmitting device concerning the transmitted data. The feedback may indicate to the transmitting device whether the transmission of the data is successful. If the previous transmission is not successful, the transmitting device may retransmit the data.

To provide an example, consider a scenario in which the UE is the receiving device and a next generation node B (gNB) of a fifth generation (5G) new radio (NR) network is the transmitting device. Initially, the network configures a component carrier (CC) that includes one or more HARQ processes. Initially, the gNB may transmit physical downlink shared channel (PDSCH) data to the UE via the CC. The UE processes the PDSCH and generates HARQ feedback bits. In this example, the HARQ feedback bits may include an acknowledgement (ACK) indicating successful reception by the UE or a negative acknowledgement (NACK) indicating unsuccessful reception by the UE. The UE may then transmit HARQ feedback to the gNB.

In addition, the exemplary embodiments are also described with regard to cancelled HARQ feedback. The term "cancelled HARQ feedback" generally refers to HARQ feedback (e.g., ACKs, NACKs, etc.) that was scheduled to be transmitted by the UE at a particular time or opportunity but not actually transmitted at the scheduled time or opportunity. The cancelled HARQ feedback may then be retransmitted by the UE at a subsequent time or opportunity.

The above examples described two different types of retransmissions. First, a retransmission performed by the gNB in response to HARQ feedback was described. The contents of this retransmission and the basis on which it may be performed is beyond the scope of the exemplary embodiments. Second, a retransmission performed by the UE in response to cancelled HARQ feedback was described. The exemplary embodiments relate to implementing enhancements for the retransmission of cancelled HARQ feedback.

Those skilled in the art will understand that the transmission of HARQ feedback may be cancelled for any of a variety of different reasons. Specific examples of the conditions that may trigger the UE to cancel the transmission of HARQ feedback are described herein. However, these examples are merely provided for illustrative purposes. The manner in which the transmission of HARQ feedback is cancelled by the UE is beyond the scope of the exemplary embodiments. Instead, the exemplary embodiments are directed towards the handling and retransmission of the cancelled HARQ feedback. These enhancements may be used in conjunction with currently implemented HARQ procedures, future implementations of HARQ procedures or independently from other HARQ procedures. Specific examples of each of these enhancements will be provided in detail below.

In one aspect, the exemplary embodiments relate to implementing a type 3 HARQ codebook for cancelled HARQ feedback. Those skilled in the art will understand that a HARQ-ACK codebook generally refers to a mechanism that may be utilized for multiplexing HARQ feedback. Throughout this description the terms "type 3 HARQ feedback" and "one-shot HARQ feedback" may be used interchangeably and refer to HARQ feedback that is multiplexed using a type 3 HARQ codebook.

For 5G NR, the type 3 HARQ codebook was introduced in release 16 (Rel-16) for NR unlicensed (NR-U) operations. It is a mechanism in which the gNB can trigger the UE to feedback HARQ bits for all HARQ processes at the CC.

In addition, the concept of physical layer priority was also introduced in Rel-16 for ultra-reliable low latency communication (URLLC). Generally, the term "physical layer priority" refers to the concept in which the assigned priority of physical downlink shared channel (PDSCH) provides the basis for the UE to select the physical layer priority specific HARQ codebook and corresponding physical uplink control channel (PUCCH) resource for the transmission of the HARQ feedback.

Those skilled in the art will understand that the physical layer priority of the HARQ feedback may be indicated by the network in any appropriate manner. To provide an example, an indication of the physical layer priority may be provided via downlink control information (DCI). To provide another example, the indication of the physical layer priority may be provided via SPS. Thus, the UE may determine the priority of the HARQ feedback based on a priority indication provided by the network. Throughout this description, the types of physical layer priority may be referred to as "low priority" or "high priority" oy may generally be identified as a priority level (e.g., 0, 1, etc.). However, the exemplary embodiments are not limited to the physical layer priority differentiation being expressed in any particular manner. The exemplary embodiments may apply to any scenario in which the network explicitly or implicitly indicates a priority differentiation for HARQ feedback.

The exemplary embodiments relate to incorporating the concepts of physical layer priority with a type 3 HARQ codebook for the retransmission of cancelled HARQ feedback. Feedback overhead for type 3 HARQ feedback has been identified as an area of concern. For example, a single CC may be configured with 16 HARQ processes and the UE may be configured with multiple CCs. In this example, the size of the HARQ feedback may be equal to 16 bits (one for each HARQ process) multiplied by the number of CCs. Some of the exemplary enhancements described below are configured to minimize type 3 HARQ feedback overhead.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The UE 110 may connect to the 5G NR RAN 120 via a cell 120A. The cell 120A may include one or more communication interfaces to exchange data and/or information with camped UEs, the 5G NR RAN 120, the cellular core network 130, the internet 140, etc. Further, the cell 120A may include a processor configured to perform various operations. For example, the processor may be configured to perform operations related to the retransmission of HARQ feedback by the UE 110. This may include, but is not limited to, providing control information and/or data to the UE 110, enabling a type 3 codebook, requesting the retransmission of HARQ feedback, etc. However, reference to a processor is merely for illustrative purposes. The operations of the cell 120A may also be represented as a separate incorporated component of the cell or may be a modular component coupled to the node, e.g., an integrated circuit with or without firmware. For example, the integrated circuit may include input circuitry to receive signals and processing circuitry to process the signals and other information. In addition, in some cells, the functionality of the processor is split among two or more processors such as a baseband processor and an applications processor. The exemplary embodiments may be implemented in any of these or other configurations of a cell.

Any suitable association procedure may be performed for the UE 110 to connect to the 5G NR RAN 120. For example, as discussed above, the 5G NR RAN 120 may be associated with a particular cellular provider where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell or base station. As mentioned above, the use of the 5G NR RAN 120 is for illustrative purposes and any appropriate type of RAN may be used.

In addition to the NR RAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the EPC and/or the 5GC. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
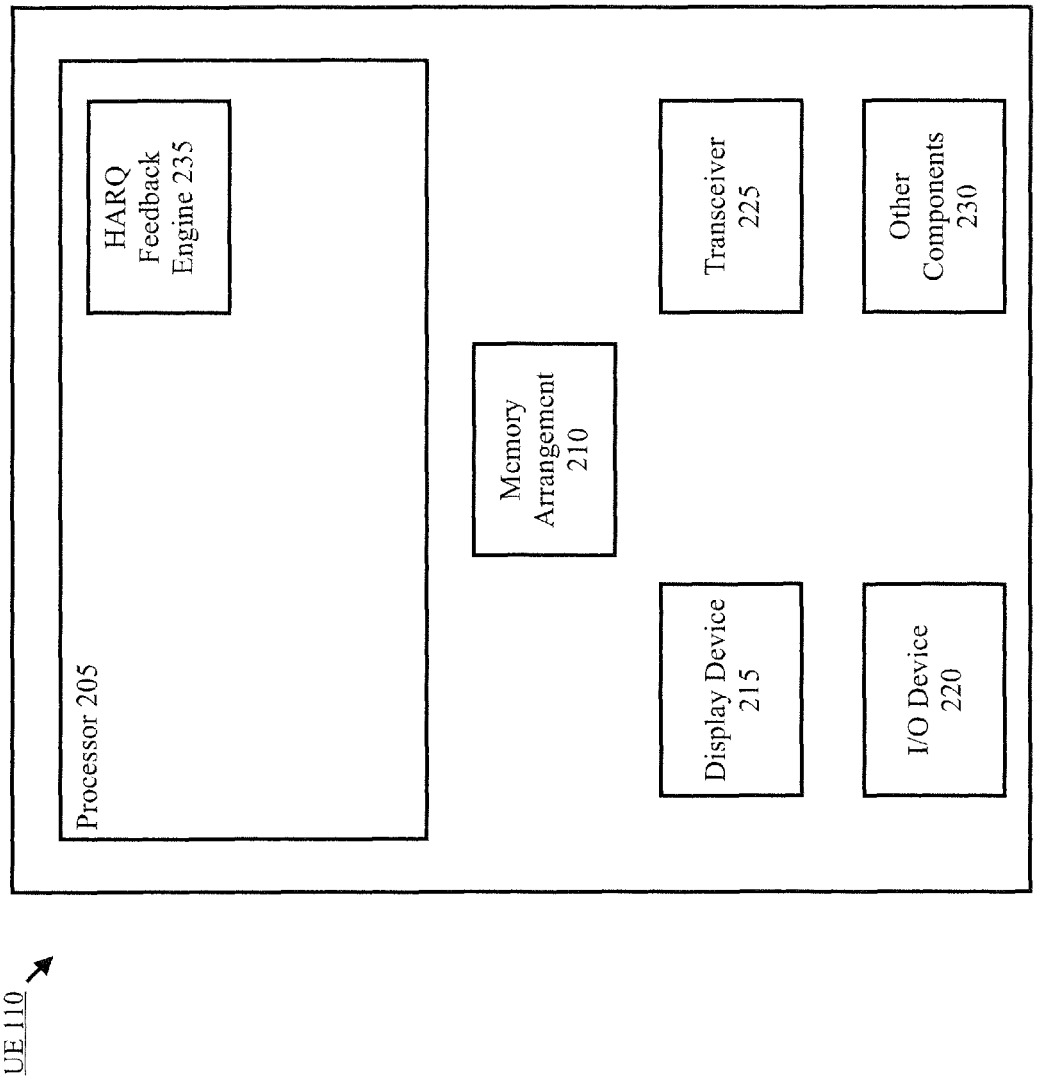
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 2. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a HARQ feedback engine 235. The HARQ feedback engine 235 may perform various operations related to the retransmission of cancelled HARQ feedback.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Various exemplary enhancements related to the retransmission of cancelled HARQ feedback will be described below with regard to the method 300 of FIG. 3 and the signaling diagram 600 of FIG. 6. The method 300 will provide a general overview of the retransmission of cancelled HARQ feedback from the perspective of the UE 110. After the general overview is provided, additional exemplary enhancements will be described. Some of the exemplary enhancements may apply to operations that are related to but not depicted in the method 300. The signaling diagram 600 will provide an example of how some of these exemplary enhancements may be implemented relative to the retransmission of cancelled HARQ feedback.

FIG. 3 shows a method 300 for the retransmission of cancelled HARQ feedback according to various exemplary embodiments. The method 300 will be described with regard to the network arrangement 100 of FIG. 1 and the UE 110 of FIG. 2.

Initially, consider a scenario in which the UE 110 and the currently camped cell are configured with a CC that includes one or more HARQ processes. In 305, the UE 110 receives a signal from the currently camped cell. The signal may include control information and/or payload data.

In 310, the UE 110 generates HARQ feedback for the one or more HARQ processes. For example, the UE 110 may generate an ACK if the information and/or data corresponding to a particular HARQ process is successfully received and a NACK if the information and/or data corresponding to the HARQ process is not successfully received. Thus, the UE 110 may generate one or more ACKs, one or more NACKs or a combination thereof. However, reference to ACKs and NACKs is merely provided for illustrative purposes. The exemplary embodiments may apply to any type of HARQ feedback.

In 315, the UE 110 determines that the scheduled transmission of the HARQ feedback is cancelled. For example, the UE 110 may be configured to transmit the HARQ feedback at a particular time or opportunity. The UE 110 and/or the network may then identify a condition that triggers the UE 110 to cancel the transmission of the HARQ feedback. Specific examples of which are provided below.

HARQ feedback may be cancelled for any of a variety of different reasons. For example, HARQ feedback may be characterized based on its physical layer priority, e.g., a "low priority HARQ-ACK" or a "high priority HARQ-ACK." In one example, a low priority HARQ-ACK may be dropped during intra-UE prioritization when the low priority HARQ-ACK collides in time with a high priority HARQ-ACK. For example, the low priority HARQ-ACK may be dropped if the transmission of the low priority HARQ-ACK and the transmission of a high priority HARQ-ACK collide at the UE 110. In another example, the low priority HARQ-ACK may be dropped as a consequence of inter-UE uplink cancellation. For example, the low priority HARQ-ACK may be cancelled due to uplink traffic from other UEs. In a further example, the low priority HARQ-ACK may be dropped for semi-persistent scheduling (SPS) HARQ-ACK dropping in a time division duplex (TDD) system.

In one example, a high priority HARQ-ACK may be dropped as a consequence of inter-UE uplink cancellation. In another example, the high priority HARQ-ACK may be dropped for SPS HARQ-ACK dropping in a TDD system. The above examples are merely provided for illustrative purposes and are not intended to limit the exemplary embodiments in any way. As mentioned above, the basis on which the transmission of HARQ feedback is cancelled is beyond the scope of the exemplary embodiments. Instead, the exemplary embodiments relate to how the UE 110 handles HARQ feedback after a corresponding transmission has been cancelled.

In 320, the UE 110 retransmits the cancelled HARQ feedback. As mentioned above, the UE 110 may use a type 3 HARQ codebook for the retransmission of the cancelled HARQ feedback. In some embodiments, the UE 110 may be triggered to perform the retransmission at a particular time or opportunity. In other embodiments, the UE 110 may be triggered to perform the retransmission based on identifying a predetermined condition. In further embodiments, the network may transmit an explicit request for transmission of the cancelled HARQ feedback.

The type 3 HARQ feedback may be configured in a variety of different ways. For example, the type 3 HARQ feedback may include a HARQ-ACK bit for each of the HARQ processes included in the CC (e.g., 16, etc.). In some embodiments, the type 3 HARQ feedback may include HARQ feedback for each CC. In other embodiments, the type 3 HARQ feedback may include HARQ feedback for only activated CCs as opposed to all configured CCs. In further embodiments, the type 3 HARQ feedback may include HARQ feedback for only a subset of activated CCs as opposed to all configured CCs. In other embodiments, the type 3 HARQ feedback may include HARQ feedback for only a subset of all configured CCs as opposed to all configured CCs.

As mentioned above, the exemplary embodiments are concerned with feedback overhead reduction for type 3 HARQ feedback. The exemplary enhancements described below aim to minimize the feedback overhead size of the type 3 HARQ feedback by accounting for physical layer priority during the selection of HARQ feedback bits for a particular CC. The exemplary embodiments relate to implementing a type 3 HARQ codebook that is configured to allow the network to easily differentiate physical layer priorities of the HARQ feedback bits.

To support priority differentiation for the type 3 HARQ codebook, the following exemplary enhancements may be implemented. The HARQ process ID space may be partitioned into two or more groups. For example, a first HARQ process ID group (e.g., group 0 (G0)) may be associated with a first priority level (e.g., priority level 0) and a second HARQ process ID group (e.g., group 1 (G1)) may be associated with a second priority level. Here, G0 may consist of {ID(0,1), ID(0,2), ID(0,3) . . . } and G1 may consist of {ID(1,1), ID(1,2), ID(1,3) . . . }. Thus, in some embodiments, each HARQ process ID may be based on or associated with a physical layer priority (e.g., priority level 0, priority level 1, etc.) and a group specific index (0 . . . 8).

To provide example within the context of the method 300, the CC may be configured with 16 HARQ processes. HARQ process IDs 1-8 (e.g., ID(0,1) . . . ID(0,8)) are to be used for the retransmission of low priority HARQ feedback (e.g., priority level 0) and HARQ process IDs 9-16 (e.g., ID(1,1) . . . ID(1,8)) are to be used for the retransmission of high priority HARQ feedback (e.g., priority level 1). Thus, when the UE 110 transmits the type 3 HARQ feedback, high priority HARQ-ACK bits will be assigned to HARQ process IDs from a first group and the low priority HARQ-ACK bits will be assigned to HARQ process IDs from a second different group. However, this example is merely provided for illustrative purposes, the exemplary embodiments may configure the HARQ process IDs in any appropriate manner.

In some embodiments, like in the example described above, there may be a hard partition of HARQ process IDs based on the physical layer priority. In other embodiments, one or more of the HARQ process IDs may be used for multiple different types of priority levels and thus, may be associated with different HARQ process ID groups. To provide an example, consider a scenario in which the CC is configured with 16 HARQ process and the HARQ process IDs are indexed 0-15. Here, a first group of HARQ process IDs 0-7 (e.g., G0) are associated with a first priority level and a second group of HARQ process IDs 4-15 (e.g., G1) are associated with a second different priority level. Thus, HARQ process IDs 4-7 may be used for either priority level. Enabling a subset of the HARQ process IDs to be associated with different priority levels may provide the cell with scheduling flexibility.

In the examples provided above, when the UE 110 is generating HARQ-ACK bits associated with a particular priority level, the UE 110 may omit the bits not associated with the corresponding priority level. For instance, in the fixed grouping example, when the UE 110 is generating high priority HARQ-ACKs (e.g., HARQ process IDs 9-16) it may omit the HARQ-ACK bits associated with HARQ process IDs 1-8 because they are associated low priority HARQ-ACKs. Accordingly, the HARQ feedback signaling overhead may be minimized by incorporating a physical layer priority differentiation with the type 3 HARQ codebook.

The manner in which the HARQ process IDs are arranged may be configured via radio resource control (RRC) signaling, a medium access control-control element (MAC-CE) or any other appropriate type of signaling. Therefore, when the UE 110 is triggered to retransmit type 3 HARQ feedback, the UE 110 and the network understand the association between HARQ process IDs and particular physical layer priorities. An example of when this signaling may take place relative to the method 300 will be provided below in FIG. 6.

For SPS, some SPS configurations may be associated with a first priority level (e.g., priority level 0) and some SPS configurations may be associated with a second different priority level (e.g., priority level 1). One exemplary enhancement relates to a HARQ process ID partition that adapts to SPS activation. In other words, the size of the HARQ process ID groups may adjust to SPS activation and deactivation.

In the third-generation partnership program (3GPP) technical specification (TS) 38.321 Rel-16, a HARQ process ID equation is defined for configured downlink assignments without an offset parameter (e.g., harq-ProcID-Offset) and a second different HARQ process ID equation is defined for configured downlink assignments without the offset parameter. Either one of these equations may be used to determine HARQ process IDs for high priority SPS or low priority SPS.

To support physical layer priority differentiation, HARQ process IDs corresponding to low priority SPS may be included in a first group (e.g., G0') of HARQ process IDs. This group may then be included in the type 3 HARQ codebook for low physical layer priority. Similarly, HARQ process IDs corresponding to high priority SPS may be included in a second group (e.g., G1') of HARQ process IDs. This group may then be included in the type 3 codebook for high physical layer priority.

In some networks, overlapping SPS configurations may be permitted on a CC. Another exemplary enhancement relates to a HARQ process ID partition that adapts to overlapping SPS. For example, a time window may be used to determine the slots where PDSCH reception will lead to the inclusion of their HARQ feedback bits in the type 3 HARQ codebook. Within this window, an overlapping SPS PDSCH handling rule may be applied (e.g., Rel-16 SPS overlapping rules). After the rule is applied, the surviving SPS and their corresponding HARQ processes may be determined. Depending on the SPS priority of the outputted HARQ processes, they may be included in a group of HARQ process IDs corresponding to high priority SPS or a group of HARQ process IDs corresponding to low priority SPS.

Different use cases may have different HARQ feedback overhead. Thus, it may be beneficial to implement HARQ process ID group specific configurations or physical layer priority specific one-shot HARQ feedback configurations. For instance, in enhanced mobile broadband (eMBB), code block group (CBG) based HARQ feedback may lead to a higher spectral efficiency for the downlink transmission. For URLLC, since the throughput requirement is typically not so demanding and timely feedback with high reliability is more important, a lighter feedback overhead is preferred.

One exemplary feedback overhead reduction enhancement is the ability of the network to selectively configure a HARQ process ID group with a particular set of features. For example, a first HARQ process ID group may be configured with one or more features such as, but not limited to, spatial bundling, CBG based feedback, new data indicator (NDI) feedback, a set of CCs, etc. A second HARQ process ID groups may be configured with a different set of features relative to another one of the HARQ process ID groups. However, the exemplary embodiments are not limited to a scenario in which multiple groups are configured. There may be scenarios where only a single HARQ process ID group is configured, e.g., only a low priority group or only a high priority group.

The HARQ process ID group specific configuration may be enabled via RRC signaling, a MAC CE or any other appropriate type of signaling. The ability to selectively control the features of the HARQ process ID groups enables the network to manage the overhead of the HARQ feedback associated with each HARQ process ID group. An example of a HARQ process ID group specific RRC configuration is shown in FIG. 4.

Another exemplary feedback overhead reduction enhancement is the ability of the network to selectively configure a physical layer priority with a particular set of features. For example, a first physical layer priority may be configured with one or more features such as, but not limited to, spatial bundling, CBG based feedback, new data indicator (NDI) feedback, a set of CCs, etc. A second physical layer priority may be configured with a different set of features relative to another one of the physical layer priorities. However, the exemplary embodiments are not limited to a scenario in which multiple groups are configured. There may be scenarios where only a single physical layer priority is configured, e.g., only a low priority group or only a high priority group.

By restricting the feedback for a set or subset of CCs, the feedback overhead can be reduced. The set of CCs may be selected from the configured CCs in a cell group or activated CCs in a cell group. If PUCCH groups are configured, then the set of CCs included in the same type 3 HARQ codebook come from the CCs under the same PUCCH cell group. The above referenced features including, spatial bundling, CBG based feedback in the type 3 HARQ codebook for a cell which is configured with CBG based feedback, NDI in the type 3 HARQ codebook and a set of CCs may be selectively used.

The physical layer priority specific configuration may be enabled via RRC signaling, a MAC CE or any other appropriate type of signaling. The ability to selectively control the features of the HARQ process ID groups enables the network to manage the overhead of the HARQ feedback associated with each HARQ process ID group. Additional details regarding this enhancement are described below with regard to FIGS. 7-8.

Another exemplary enhancement relates to the network configuring the UE 110 with one-shot HARQ feedback for a particular number of groups or a particular number of HARQ process IDs. In one example, the cell 120A may configure the UE 110 with one-shot HARQ feedback for all HARQ process IDs on a CC. In another example, the cell 120A may configure the UE 110 with one-shot HARQ feedback for HARQ process ID group 0 only. In another example, the cell 120A may configure the UE 110 with one-shot HARQ feedback for HARQ process ID group 1 only. In another example, the cell 120A may configure the UE 110 with one-shot HARQ feedback for HARQ process ID group 0 and HARQ process ID group 1.

Alternatively, in one example, the cell 120A may configure the UE 110 with one-shot HARQ feedback for low physical layer priority only. In another example, the cell 120A may configure the UE 110 with one-shot HARQ feedback for high physical layer priority only. In another example, the cell 120A may configure the UE 110 with one-shot HARQ feedback for low physical layer priority feedback and high physical layer priority feedback.

In Rel-16 NR-U, a one-shot HARQ-ACK request is introduced to support the triggering of type 3 HARQ codebook reporting. In addition, in Rel-16 URLLC, a priority indicator is introduced that is configured to enable the UE 110 to select the physical layer priority specific HARQ feedback codebook and its associated PUCCH resources. The request and indicator may be transmitted in DCI (e.g., DCI 1_1, Rel-17 DCI 1_2, etc.).

One exemplary enhancement relates to UE behavior in response to a one-shot HARQ-ACK request and/or a priority indicator when the UE 110 is configured to support physical layer priority for type 3 HARQ codebook. FIG. 5 shows a table 500 that describes UE 110 behavior in response to DCI related to type 3 HARQ feedback.

The column 502 represents the presence of a one-shot HARQ-ACK request in DCI. Specifically, the fields with "0" indicate that a value of "0" is indicated in the one-shot HARQ-ACK request field in the DCI and the fields with "1" indicate a value of "1" is indicated in the one-shot HARQ-ACK request field in the DCI.

The column 504 represents the presence of a physical layer priority indicator in the DCI. As will be explained in more detail below, the fields with "1" and "0" may indicate more than simply the value of a priority indicator field in the DCI.

The DCI may include fields for the above referenced indicators. Like the table 500, the DCI may implement the "0" and "1" designation. However, reference to this type of differentiation is merely provided for illustrative purposes. In an actual deployment scenario, the fields of the DCI may be populated with any appropriate type of bit, value or indicator.

The column 506 describes UE behavior in response to the contents of the DCI. In row 512, one-shot HARQ-ACK feedback is not triggered based on the value of the one-shot HARQ-ACK request field in the DCI. Similarly, in row 514, one-shot HARQ-ACK feedback is not triggered based on the value of the one-shot HARQ-ACK request field in the DCI.

In row 516, one-shot HARQ-ACK reporting is triggered based on the value of the one-shot HARQ-ACK request field in the DCI. In this example, the "0" in column 504 indicates that one-shot HARQ-ACK feedback for group 0 is triggered. For uplink control information (UCI) multiplexing, the PUCCH transmission of the HARQ feedback may be treated as high physical layer priority. Thus, despite value of this field being "0" the UE 110 treats the retransmission of the one-shot HARQ feedback as high priority. Since the cell has indicated its intention to receive the one-shot HARQ feedback, the retransmission may be treated as high priority to decrease the likelihood that the retransmission is cancelled.

In row 518, one-shot HARQ-ACK feedback is triggered based on the value of the one-shot HARQ-ACK request field in the DCI. In this example, the "1" in column 504 indicates that one-shot HARQ-ACK for group 1 is triggered. Like the example provided above, the PUCCH transmission is treated as high physical layer priority. Accordingly, in the examples provided above, the value of the priority indicator field may be used to trigger a HARQ process ID group corresponding to a particular physical layer priority.

In other embodiments, when the one-shot HARQ-ACK request field in the DCI is set to "1" and when the priority indicator field is set to "0," the PUCCH transmission for type 3 HARQ codebook is treated as high priority. Thus, transmissions from either HARQ process ID group may be treated as high priority. In another alternative embodiments, when the one-shot HARQ-ACK request field in DCI is set to "1" and when the priority indicator field is set to "0," the PUCCH transmission for type 3 HARQ codebook is treated as low priority.

In some embodiments, both one-shot HARQ feedback and other HARQ-ACK feedback maybe scheduled in the same slot. In accordance with one exemplary enhancement, the UE 110 may be triggered to report both the one-shot HARQ feedback and the other HARQ-ACK feedback in the same slot. The one-shot HARQ feedback and the other HARQ-ACK feedback may be for the same physical layer priority or for different physical layer priorities.

Figure 6:
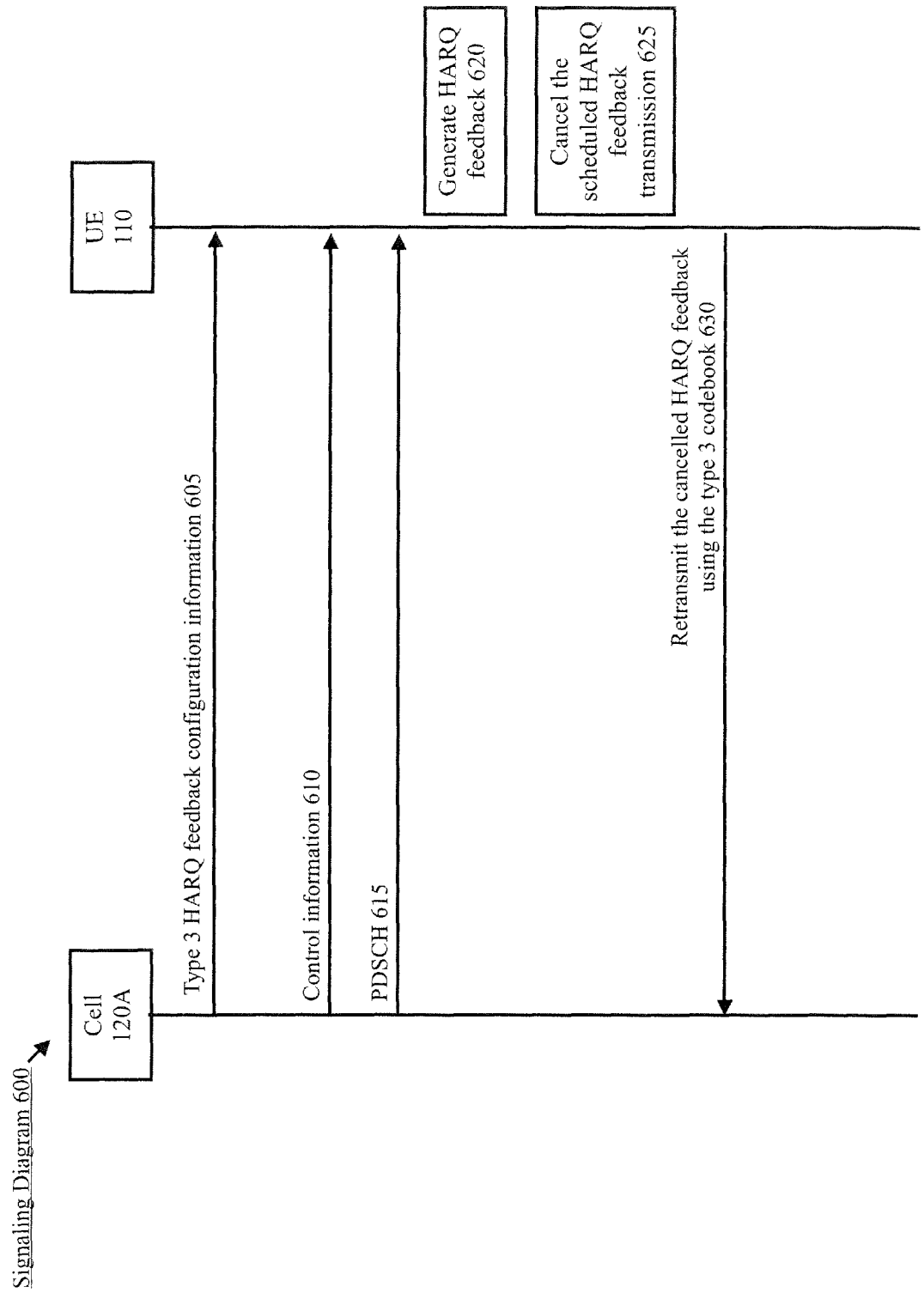
FIG. 6 shows a signaling diagram for the retransmission of cancelled HARQ feedback according to various exemplary embodiments.

FIG. 6 shows a signaling diagram 600 for the retransmission of cancelled HARQ feedback according to various exemplary embodiments. The signaling diagram will be described with regard to the network arrangement 100 of FIG. 1, the UE 110 of FIG. 2 and the method 300 of FIG. 3.

As mentioned above, the signaling diagram 600 will provide an example of how the network and the UE 110 may incorporate the exemplary enhancements into the retransmission of cancelled HARQ feedback.

The signaling diagram 600 includes the UE 110 and the cell 120A. In 605, the cell 120A transmits type 3 HARQ feedback configuration information to the UE 110. This configuration information may include the configuration of the HARQ process ID space. For example, the configuration information may indicate a fixed HARQ process ID group partition or a flexible HARQ process ID group partition on a CC. The configuration information may also include an indication that a particular HARQ process ID group is configured with features such as, but not limited to, spatial bundling, CBG based feedback, new data indicator (NDI) feedback, a set of CCs, etc.

In addition, the configuration information may indicate that one-shot HARQ feedback is only configured for a particular number of HARQ process ID groups or a particular number of HARQ process IDs or physical layer priority. In one example, the cell 120A may configure the UE 110 with one-shot HARQ feedback for all HARQ process IDs on a CC. In another example, the cell 120A may configure the UE 110 with one-shot HARQ feedback for HARQ process ID group 0 only. In another example, the cell 120A may configure the UE 110 with one-shot HARQ feedback for HARQ process ID group 1 only. In another example, the cell 120A may configure the UE 110 with one-shot HARQ feedback for HARQ process ID group 0 and HARQ process ID group 1.

In another example, the UE 110 is configured with one-shot HARQ feedback with low physical layer priority only. In another example, the UE 110 is configured with one-shot HARQ feedback with high physical layer priority only. In another example, the UE 110 is configured with one-shot HARQ feedback with low physical layer priority and one-shot HARQ feedback with high physical layer priority.

From a signaling perspective, the configuration information may be provided in one or more RRC signals. Instead of or in addition to the one or more RRC signals, one or more MAC CEs may be utilized to provide the configuration information in 605. Thus, reference to a single signal for the configuration information in 605 is merely provided for illustrative purposes. The exemplary embodiments apply to this configuration information being provided in any appropriate manner.

In 610, the cell 120A transmits control information to the UE 110. As indicated above, the exemplary embodiments are applicable to both configured grant DCI and SPS activation. Thus, the control information in 610 may represent DCI and/or SPS control information. The control information in 610 may include an indication of the physical layer priority. In addition, the control information may include the one-shot HARQ-ACK request or any other appropriate indication triggering type 3 HARQ feedback.

In 615, the cell 120A transmits PDSCH to the UE 110. In 620, the UE 110 generates HARQ feedback for one or more HARQ processes. The PDSCH may be provided via one or more CC and each CC may be configured with multiple HARQ processes.

In 625, the UE 110 cancels the scheduled transmission of the HARQ feedback. As mentioned above, HARQ feedback may be cancelled for any of a variety of different reasons. The exemplary embodiments apply to HARQ feedback cancelled for any appropriate reason.

In 630, the UE 110 retransmits the cancelled HARQ feedback using the type 3 HARQ codebook. In some embodiments, since the UE 110 is configured with type 3 HARQ codebook configuration information the UE 110 may retransmit the cancelled HARQ feedback soon as possible without an explicit request from the network. In other embodiments, the network may trigger the retransmission by transmitting DCI after the initial transmission is cancelled (not pictured).

In this example, the UE 110 may select HARQ-ACK bits for the type 3 HARQ codebook based on the configuration information received in 605 and/or the control information received in 610. In addition, the HARQ-ACK bits may be arranged in accordance with the corresponding physical layer priority by using the priority level specific HARQ process ID groups. Further, the HARQ feedback may be configured to with additional features such as, but not limited to, NDI, CBG based feedback, spatial bundling, a set of CCs, etc.

The signaling diagram 600 is just one example of a signaling exchange that includes the retransmission of cancelled HARQ feedback. The exemplary embodiments are not limited to this type of signaling exchange and may be implemented in any appropriate manner. Those skilled in the art will understand how each the exemplary enhancements described herein may be incorporated into other currently implemented cancelled HARQ feedback signaling exchanges, future implementations of cancelled HARQ feedback signaling exchanges or independently from other cancelled HARQ feedback signaling exchanges.

As mentioned, several times above, one exemplary feedback overhead reduction enhancement is the ability of the network to selectively configure a physical layer priority with a particular set of features. In Rel-16 URLLC, physical layer priority for PDSCH is introduced to select the PUCCH for HARQ feedback and also for HARQ codebook construction. If HARQ feedback corresponding to PDSCH at one physical layer priority only is included in the feedback, then the payload size of the HARQ feedback may be less than that with the Rel-16 type 3 HARQ codebook.

Since HARQ feedback may be characterized based on its corresponding physical layer priority, the configuration of the inclusion of certain features may be specified via RRC signaling. Features including, but not limited to, spatial bundling, CBG based feedback in the type 3 HARQ codebook for a cell which is configured with CBG based feedback, NDI in the type 3 HARQ codebook and a set of CCs may be selectively used. An example of physical layer priority specific RRC configuration is shown in FIG. 7.

Another exemplary enhancement relates to UE behavior in response to a one-shot HARQ-ACK request and/or a priority indicator when the UE 110 is configured to support physical layer priority for type 3 HARQ codebook. FIG. 8 shows a table 800 that describes UE 110 behavior in response to DCI related to type 3 HARQ feedback. In contrast to the table 500, the table 800 relates to a physical layer priority without the HARQ process ID partitioning scheme.

The column 802 represents the presence of a one-shot HARQ-ACK request in DCI. Specifically, the fields with "0" indicate that a value of "0" is indicated in the one-shot HARQ-ACK request field in the DCI and the fields with "1" indicate a value of "1" is indicated in the one-shot HARQ-ACK request field in the DCI.

The column 804 represents the presence of a physical layer priority indicator in the DCI. As will be explained in more detail below, the fields with "1" and "0" may indicate more than simply the value of a priority indicator field in the DCI.

The DCI may include fields for the above referenced indicators. Like the table 800, the DCI may implement the "0" and "1" designation. However, reference to this type of differentiation is merely provided for illustrative purposes. In an actual deployment scenario, the fields of the DCI may be populated with any appropriate type of bit, value or indicator.

The column 806 describes UE behavior in response to the contents of the DCI. In row 812, one-shot HARQ-ACK feedback is not triggered based on the value of the one-shot HARQ-ACK request field in the DCI. Similarly, in row 814, one-shot HARQ-ACK feedback is not triggered based on the value of the one-shot HARQ-ACK request field in the DCI.

In row 816, one-shot HARQ-ACK reporting is triggered based on the value of the one-shot HARQ-ACK request field in the DCI. In this example, the "0" in column 804 indicates that one-shot HARQ-ACK feedback for low physical layer priority is requested. For uplink control information (UCI) multiplexing, the PUCCH transmission of the HARQ feedback may be treated as low physical layer priority. In some embodiments, HARQ codebook construction may be performed according to pdsch-HARQ-ACK-OneShotFeedback-r16 and pdsch-HARQ-ACK-OneShotFeedbackCBG-r16 under OneShotFeedback-for-LowPriority.

In row 818, one-shot HARQ-ACK feedback is triggered based on the value of the one-shot HARQ-ACK request field in the DCI. In this example, the "1" in column 804 indicates that one-shot HARQ-ACK for high physical layer priority is requested. Here, the PUCCH transmission may be treated as high physical layer priority. In some embodiments, HARQ codebook construction may be performed according to pdsch-HARQ-ACK-OneShotFeedback-r16 and pdsch-HARQ-ACK-OneShotFeedbackCBG-r16 under OneShot-Feedback-for-HighPriority.

In some scenarios, the gNB may schedule URLLC traffic over selected CCs or, in consideration of feedback overhead, only a selected set of CCs may be included in one-shot HARQ feedback at a given physical layer priority. For example, the UE 110 may be configured with 6 CCs where CCs 1-3 may be associated with eMBB traffic and CCs 4-6 may be associated with URLLC traffic. In this example, one-shot HARQ feedback with low physical layer priority may include HARQ-ACK feedback for CCs 1-3 and one-shot HARQ feedback with high physical layer priority includes HARQ-ACK feedback for CCs 4-6.

In another example, the UE 110 may be configured with 6 CCs where CCs 1-6 may be associated with eMBB traffic and CCs 4-6 may be associated with URLLC traffic. In this example, one-shot HARQ feedback with low physical layer priority may include HARQ-ACK feedback for CCs 1-6 and one-shot HARQ feedback with high physical layer priority includes HARQ-ACK feedback for CCs 4-6.

Continuing with the above example, the gNB may schedule PDSCH carrying eMBB over CCs 1-4 (e.g., with the priority indicator set to "0" in the DCI). When "One-shot HARQ-ACK request"="1", and "priority indicator"="0" in a DCI triggering one-shot HARQ feedback, only HARQ feedback bits for CCs 1-3 are included to reduce feedback overhead. Thus, the association of a set of CCs with a physical layer priority for one-shot HARQ feedback does not necessarily put a restriction on the freedom of gNB in choosing a CC for transmitting PDSCH carrying eMBB or URLLC data. Similarly, the gNB may choose to schedule PDSCHs carrying URLLC data over CCs 1-6 (e.g. with "priority indicator" set to "1" in the DCIs scheduling those PDSCHs). When "One-shot HARQ-ACK request"="1", and "priority indicator"="1" in a DCI triggering one-shot HARQ feedback, only HARQ feedback bits for CCs 4-6 are included to reduce feedback overhead. The set or subset of CCs for each physical layer priority for one-shot HARQ feedback can be included in the associated-CC-list as given in the example.

Alternatively, the association of a CC for one-shot HARQ feedback can be set with an IE entitled "associated-oneshot-feedback" in PDSCH-ServingCellConfig. In this example, "associated-oneshot-feedback" set to {0} in the IE may indicate to the UE 110 the CC's inclusion in the one-shot HARQ feedback triggered by a DCI with the combination of {"One-shot HARQ-ACK request"="1", "priority indicator" set to "0"}. When "associated-oneshot-feedback" is set to {1} in the IE, this may signify to the UE 110 the CC's inclusion in the one-shot HARQ feedback triggered by a DCI with the combination of {"One-shot HARQ-ACK request"="1", "priority indicator" set to "1"}. In addition, when "associated-oneshot-feedback" is set to {0,1} in the IE this may signify to the UE 110 the CC's inclusion in an one-shot HARQ feedback triggered by a DCI with the combination of {"One-shot HARQ-ACK request"="1", "priority indicator" set to "0"} or {"One-shot HARQ-ACK request"="1", "priority indicator" set to "1"}.

To further reduce feedback overhead the above referenced examples may be configured to incorporate the partitioning of HARQ process IDs. FIG. 9 shows a table 900 that describes UE 110 behavior in response to DCI related to type 3 HARQ feedback. In contrast to the tables 500 and 800, the table 900 relates to implementing a scheme in that includes an association between code state combinations and HARQ process IDs.

Initially, consider a scenario in which there are 16 HARQ process IDs configured for a CC. In this example, HARQ process IDs 0-11 may be used for the code state combination {One-shot HARQ-ACK request="1", Priority indicator="0"} in the triggering DCI for one-shot HARQ feedback, and HARQ process IDs 12-15 may be used {One-shot HARQ-ACK request="1", Priority indicator="1"}.

Here, the gNB still has the freedom to use any HARQ process ID for either transmission with low or high physical layer priority. However, if the gNB chooses to limit URLLC traffic with HARQ process IDs in the range {12-15}, then the one-shot feedback with {One-shot HARQ-ACK request="1", Priority indicator="1"} reports HARQ process IDs 12-15 on the CC rather than for HARQ process IDs 0-15. This feature may be easily incorporated with dynamic grant PDSC. With SPS PDSCHs, as the HARQ process ID with a SPS PDSCH is determined with a formula from TS 38.321, it may be difficult to restrain the HARQ process IDs to a given range or a given subset of {0, 1, . . . , 15}. The exemplary embodiments further refine this scheme using the table 900.

The column 902 represents the presence of a one-shot HARQ-ACK request in DCI. Specifically, the fields with "0" indicate that a value of "0" is indicated in the one-shot HARQ-ACK request field in the DCI and the fields with "1" indicate a value of "1" is indicated in the one-shot HARQ-ACK request field in the DCI.

The column 904 represents the presence of a physical layer priority indicator in the DCI. As will be explained in more detail below, the fields with "1" and "0" may indicate more than simply the value of a priority indicator field in the DCI.

The DCI may include fields for the above referenced indicators. Like the table 900, the DCI may implement the "0" and "1" designation. However, reference to this type of differentiation is merely provided for illustrative purposes. In an actual deployment scenario, the fields of the DCI may be populated with any appropriate type of bit, value or indicator.

The column 906 describes UE behavior in response to the contents of the DCI. In row 912, one-shot HARQ-ACK feedback is not triggered based on the value of the one-shot HARQ-ACK request field in the DCI. Similarly, in row 914, one-shot HARQ-ACK feedback is not triggered based on the value of the one-shot HARQ-ACK request field in the DCI.

In row 916, one-shot HARQ-ACK reporting is triggered based on the value of the one-shot HARQ-ACK request field in the DCI. Here, HARQ codebook construction may be performed according to pdsch-HARQ-ACK-OneShotFeedbackCBGr-16 and pdsch-HARQ-ACK-OneShotFeedback-CBG-r16 under OneShotFeedback-for-LowPriority for a first set of selected HARQ process IDs ($S_1$) (e.g., all HARQ process IDs or {0, . . . , 11}. For UCI multiplexing, the PUCCH transmission is treated as low physical layer priority.

In row 918, one-shot HARQ-ACK reporting is triggered based on the value of the one-shot HARQ-ACK request field in the DCI. Here, HARQ codebook construction may be performed according to pdsch-HARQ-ACK-OneShotFeedbackCBGr-16 and pdsch-HARQ-ACK-OneShotFeedback-CBG-r16 under OneShotFeedback-for-HighPriority for a second set of selected HARQ process IDs ($S_2$) (e.g., {1,3,5} or a set of consecutive indices {12, 13, 14, 15}). For UCI multiplexing, the PUCCH transmission is treated as high physical layer priority.

In this example, the partitioning of HARQ process IDs does not have to be exclusive. That is, there may be a scenario in which $S_1 \cap S_2 \neq \emptyset$. The number of HARQ processes on a CC may be individually configured by the IE nrofHARQ-ProcessesForPDSCH under PDSCH-ServingCellConfig. To reduce signaling overhead, a percentage of nrofHARQ-ProcessesForPDSCH may be set aside for one group. For example, instead of indicating {12,13,14,15} for HARQ process ID group 2, 25 percent of nrofHARQ-ProcessesForPDSCH may be assumed for HARQ process ID group 2.

Those skilled in the art will understand that the above-described exemplary embodiments may be implemented in any suitable software or configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   generating hybrid automatic repeat request (HARQ) feedback for one or more HARQ process corresponding to a component carrier (CC);
   identifying that a scheduled transmission for the HARQ feedback has been cancelled; and
   retransmitting the cancelled HARQ feedback using a type 3 HARQ codebook, wherein a HARQ process ID space for the type 3 HARQ codebook is partitioned into multiple HARQ process ID groups, each HARQ process ID group corresponding to a different physical layer priority,
   wherein the CC is configured with a number of HARQ process,
   wherein a first HARQ process ID group includes a first fixed number of HARQ process IDs and a second HARQ process ID group include a second fixed number of HARQ process IDs, and
   wherein a total of the first fixed number of HARQ process IDs plus the second fixed number of HARQ process IDs is equal to the number of HARQ processes.

2. The processor of claim 1, wherein the CC is configured with a number of HARQ process,
   wherein a first HARQ process ID group includes a first number of HARQ process IDs and a second HARQ process ID group include a second number of HARQ process IDs, and
   wherein a subset of the HARQ process IDs is associated with both the first HARQ process ID group and the second HARQ process ID group.

3. The processor of claim 1, wherein a first HARQ process ID group is configured for low priority semi-persistent scheduling (SPS) HARQ feedback and a second HARQ process ID group is configured for high priority SPS HARQ feedback.

4. The processor of claim 3, the operations further comprising:
   identifying a time window;
   applying an overlapping SPS physical downlink shared channel (PDSCH) rule to slots included in the time window;
   determining a SPS configuration based on the overlapping SPS PDSCH rule;
   determining a set of HARQ processes associated with the SPS configuration; and
   determining that the set of HARQ processes are associated with one or the first HARQ process ID group or the second HARQ process ID group.

5. The processor of claim 1, the operations further comprising:
   receiving an indication, via radio resource control (RRC) signaling, that a HARQ process ID group is configured with one or more of spatial bundling, code block group (CBG) based feedback or new data indicator (NDI) feedback.

6. The processor of claim 1, the operations further comprising:
   receiving an indication, via radio resource control (RRC) signaling, that the UE is configured with one-shot HARQ feedback for all HARQ process IDs associated with the CC, for a first HARQ process ID group only or for a second HARQ process ID group only.

7. The processor of claim 1, the operations further comprising:
   receiving downlink control information (DCI) including a one-shot HARQ-ACK request field and a priority indicator field.

8. The processor of claim 7, wherein the priority indicator field includes a single value that indicates i) that the retransmission is for only a first HARQ process ID group from a set of multiple HARQ process ID groups and ii) that the retransmission is to be treated as a high physical layer priority.

9. A user equipment (UE) including:
   a transceiver configured to communicate with a network; and
   a processor communicatively coupled to the transceiver and configured to perform operations comprising:
   generating hybrid automatic repeat request (HARQ) feedback for one or more HARQ process corresponding to a component carrier (CC);
   identifying that a scheduled transmission for the HARQ feedback has been cancelled; and
   retransmitting the cancelled HARQ feedback using a type 3 HARQ codebook, wherein a HARQ process ID space for the type 3 HARQ codebook is partitioned into multiple HARQ process ID groups, each HARQ process ID group corresponding to a different physical layer priority,
   wherein the CC is configured with a number of HARQ process,
   wherein a first HARQ process ID group includes a first fixed number of HARQ process IDs and a second HARQ process ID group include a second fixed number of HARQ process IDs, and
   wherein a total of the first fixed number of HARQ process IDs plus the second fixed number of HARQ process IDs is equal to the number of HARQ processes.

10. The UE of claim 9, the operations further comprising:
    receiving an indication that cancelled HARQ feedback associated with only one of a high physical layer priority or a low physical layer priority is configured to include one or more of new data indicator (NDI) feedback and code block group (CBG) based feedback for a CC which is configured with CBG based HARQ feedback for a subset of configured CCs.

11. The UE of claim 9, the operations further comprising:
    receiving an indication that cancelled HARQ feedback associated with only one of a high physical layer priority or a low physical layer priority is configured to include one or more of new data indicator (NDI) feedback and code block group (CBG) based feedback for a CC which is configured with CBG based HARQ feedback for a subset of configured CCs where the subset constitutes all the configured CCs in a cell group.

12. The UE of claim 9, the operations further comprising:
    receiving an indication that cancelled HARQ feedback associated with only one of a high physical layer priority or a low physical layer priority is configured to include one or more of new data indicator (NDI) feedback and code block group (CBG) based feedback for a CC which is configured with CBG based HARQ feedback for a subset of activated CCs.

13. The UE of claim 9, the operations further comprising:
    receiving an indication that cancelled HARQ feedback associated with only one of a high physical layer priority or a low physical layer priority is configured to include one or more of new data indicator (NDI)

feedback and code block group (CBG) based feedback for a CC which is configured with CBG based HARQ feedback for a subset of activated CCs where the subset constitutes all the activated component carriers in a cell group.

14. A processor of a base station configured to perform operations comprising:
   configuring a user equipment (UE) with a component carrier (CC), wherein the CC is configured to include multiple HARQ processes;
   transmitting a signal to the UE, wherein the UE is configured to generate hybrid automatic repeat request (HARQ) feedback for one or more HARQ process in response to the signal;
   and
receiving the HARQ feedback, wherein the HARQ feedback is cancelled HARQ feedback and transmitted by the UE using a type 3 HARQ codebook, wherein a HARQ process ID space for the type 3 HARQ codebook is partitioned into multiple HARQ process ID groups, each HARQ process ID group corresponding to a different physical layer priority,
   wherein the CC is configured with a number of HARQ process,
   wherein a first HARQ process ID group includes a first fixed number of HARQ process IDs and a second HARQ process ID group include a second fixed number of HARQ process IDs, and
   wherein a total of the first fixed number of HARQ process IDs plus the second fixed number of HARQ process IDs is equal to the number of HARQ processes.

15. The processor of claim 14, wherein a HARQ process ID space for the type 3 HARQ codebook is partitioned into multiple HARQ process ID groups, each HARQ process ID group corresponding to a different physical layer priority.

16. The processor of claim 15, wherein a first HARQ process ID group is configured for low priority semi-persistent scheduling (SPS) HARQ feedback and a second HARQ process ID group is configured for high priority SPS HARQ feedback.

17. The processor of claim 14, the operations further comprising:
   transmitting an indication, via radio resource control (RRC) signaling, that a HARQ process ID group is configured with one of spatial bundling, code block group (CBG) based feedback or new data indicator (NDI) feedback.

18. The processor of claim 14, the operations further comprising:
   transmitting downlink control information (DCI) including a one-shot HARQ-ACK request field and a priority indicator field to the UE.

* * * * *